United States Patent Office 3,538,745
Patented Nov. 10, 1970

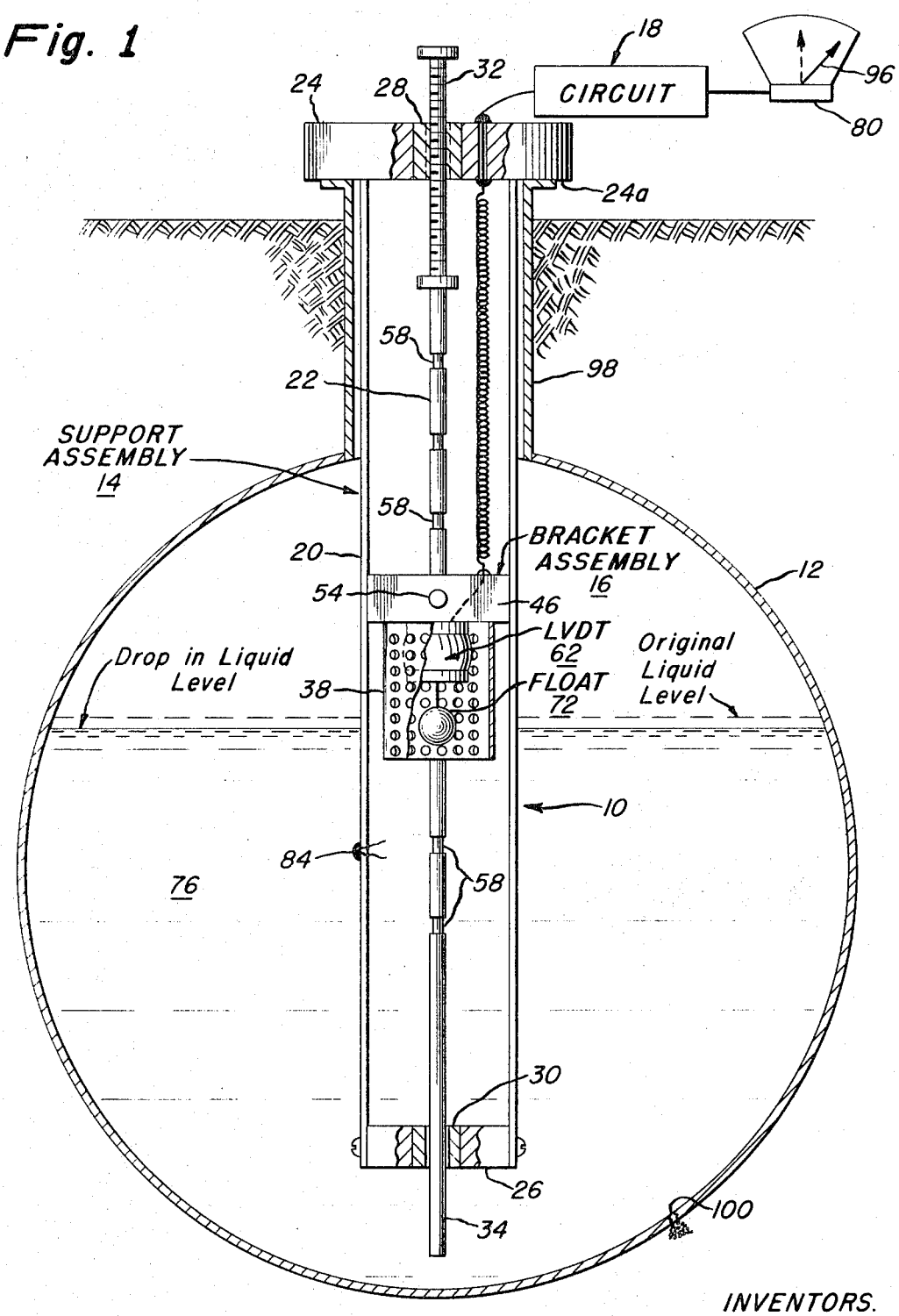

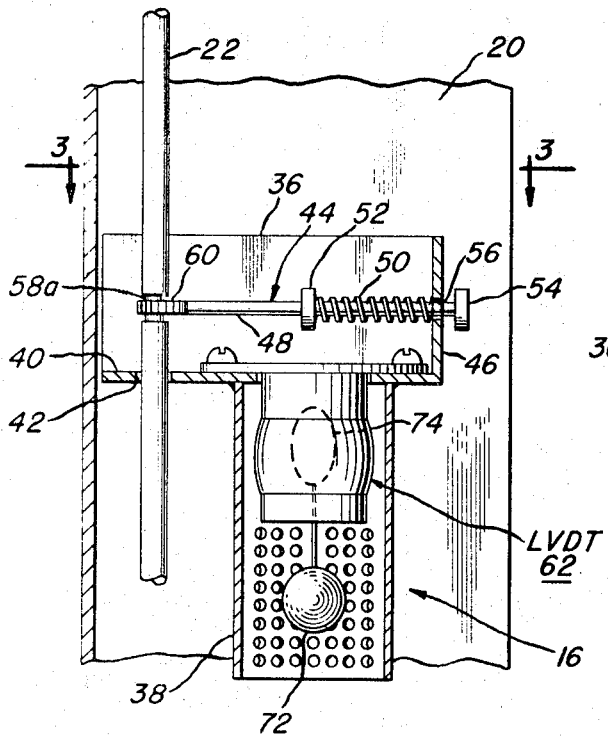
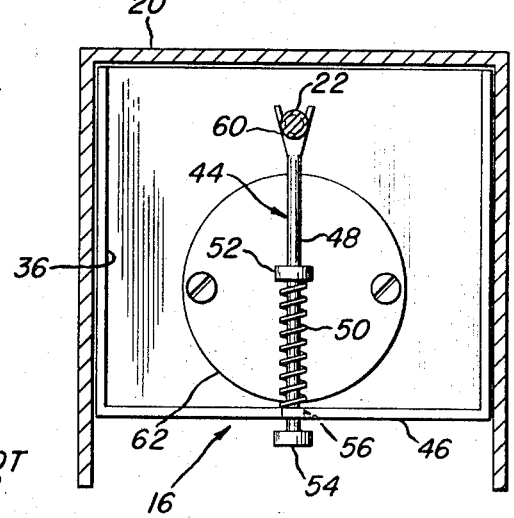
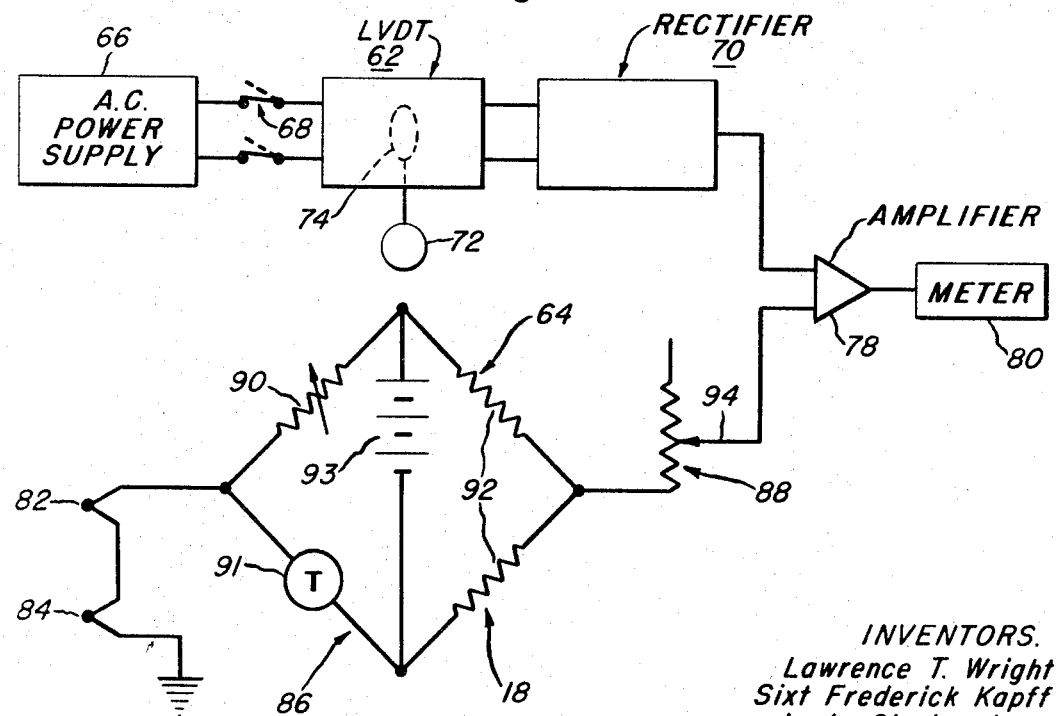

3,538,745
APPARATUS FOR DETECTING LEAKS IN TANKS STORING LIQUIDS
Lawrence T. Wright and Sixt Frederick Kapff, Homewood, and Irwin Ginsburgh, Morton Grove, Ill., assignors to Standard Oil Company, Chicago, Ill., a corporation of Indiana
Filed Nov. 29, 1968, Ser. No. 779,936
Int. Cl. G01m 3/00
U.S. Cl. 73—49.2                        11 Claims

ABSTRACT OF THE DISCLOSURE

The apparatus of our invention includes a support rod, which preferably is made of a material having virtually a zero coefficient of expansion at normal ambient temperatures. Mounted on this rod is an adjustable bracket assembly housing a linear-variable-differential-transformer (LVDT) and a float operably connected to the movable core of the LVDT. The bracket assembly is moved to a position on the rod which brings the float into floating relationship with the liquid contained in the tank. Any movement thereafter by the float regulates the character of a signal being generated by a circuit which includes the LVDT. Since either tank leakage or a change in the temperature of the stored liquid is responsible for changes in liquid level, the circuit of our invention includes means for providing a temperature-compensated signal which only represents a change in liquid level due to leakage. This feature is optional.

BACKGROUND OF THE INVENTION

Undetected slow leakage of gasoline from rusted-out or punctured storage tanks is a serious fire hazard, and present methods for detecting such tank leakage are complicated and unreliable. For example, the American Petroleum Institute method for detecting underground gasoline storage tank leakage requires: (a) filling the tank completely with gasoline, (b) attaching a calibrated, transparent tube to the flange of the tank's fill pipe, (c) adding more gasoline to the tank in order to bring the liquid level up into the tube, (d) stirring the gasoline in the tank to aid in maintaining a uniform temperature throughout the gasoline, and (e) watching the liquid level in the tube to see if it changes over a period of time—a drop in liquid level normally indicates that the tank leaks.

This method must take into account changes in temperature and tank bulging. Hence, it is necessary to continually monitor temperature during the test period to the nearest 0.01° F., and if temperature changes, to make allowances for this. Moreover, due to the increased pressure of a full load, the tank's ends gradually bulge. Consequently, the liquid level in the tube drops and the tank appears to be leaking. Again allowances must be made. These allowances can only be made by a qualified expert capable of interpreting test results, and even then, there is often doubt about the validity of the test for very small leaks.

BRIEF DESCRIPTION OF THE INVENTION

We have invented a leak detecting apparatus which provides a solution to the problems hitherto connected with detecting leakage in liquid storage tanks. The following are its principal elements: (i) support means adapted to be inserted into a storage tank, (ii) float means mounted on the support means in an adjustable manner enabling said float means to be brought into floating relationship with the liquid in the storage tank, and (iii) signal generating means coupled to the float means and actuated by any movement of said float means in response to any change in the level of liquid in said tank to generate a signal indicating said change.

The preferred support means is a rod made of a material having virtually a zero coefficient of expansion at normal ambient temperatures. One such material is a metal alloy made chiefly of iron and nickel. The nickel constitutes about 36 weight percent of the alloy, and the iron constitutes about 64 weight percent of the alloy, but minor amounts of other ingredients are also present. This alloy, which is sold by the Carpenter Steel Corporation under the trade name Invar, does not expand noticeably over a temperature ranging between about 0° F. and about 200° F. If the rod is made of such material, it will not expand or contract during testing even though the temperature of the surrounding liquid changes.

The float means is attached to a movable bracket assembly mounted on the support rod. The operator conducting the test first estimates the approximate level of the liquid in the tank, and then adjusts the bracket assembly accordingly so that, when he inserts the apparatus into the tank, the liquid in the tank will bouy up the float. Fine adjustment means are provided so that, if the estimate is not exactly correct, the float means can be brought into floating relationship with the liquid after inserting the apparatus into the tank.

An electrical circuit, including a linear-variable-differential-transformer (LVDT), constitutes the preferred signal generating means. The LVDT is mounted on the bracket assembly, and the movable core of the LVDT is operably connected to the float means. Thus, when the float means responds to changes in the level of liquid in the tank, it regulates the output signal of the LVDT by moving the core.

Two factors control the level of the liquid in the tank: the temperature of the liquid in the tank, and leakage from or into the tank. The circuit of our invention includes means for providing a temperature-compensated signal which only represents changes in liquid level due to tank leakage. Obviously, if the leak detecting test can be easily conducted at a constant temperature, then this feature is not needed.

Means for providing the temperature-compensated signal include: means responsive to changes in the temperature of the liquid during the test period which generate a temperature signal corresponding to said change, and means responsive to said temperature signal which generate a compensating signal and impose this compensating signal on the signal from the LVDT. Consequently, the LVDT signal only represents changes in liquid level due to leakage of liquid from the tank.

DESCRIPTION OF THE DRAWINGS

FIG. 1 illustrates using our apparatus to test for leakage in an underground tank containing liquid.

FIG. 2 is an enlarged cross-sectional view of the bracket assembly shown in FIG. 1.

FIG. 3 is a cross-sectional view taken along line 3—3 of FIG. 2.

FIG. 4 is a schematic drawing of the control circuit of our invention.

DESCRIPTION OF THE PREFERRED EMBODIMENT

In FIG. 1, leak detecting apparatus 10 is shown inserted into a leaking tank 12. In accordance with our invention, apparatus 10 has three major components: support assembly 14, adjustable bracket assembly 16, and signal generating circuit 18.

Support assembly 14 includes a generally U-shaped, elongated guide channel 20, and grooved Invar support rod 22 mounted longitudinally within channel 20 between support plates 24 and 26. Plates 24 and 26, which are secured to opposite ends of channel 20, have, respectively, bearing members 28 and 30, and rod 22 has ends 32 and 34 which are received within these bearing members.

Bracket assembly 16, which is shown in detail in FIGS. 2 and 3, includes yoke 36, and perforated cage 38 welded to base plate 40 of yoke 36. Support rod 22 passes through opening 42 in plate 40, and gripping device 44, mounted to front plate 46 of yoke 36, provides means for holding bracket assembly 16 stationary.

Gripping device 44 includes plunger 48 and spring 50, which is coiled about plunger 48. Spring 50, simultaneously engaging stop 52 on plunger 48 and the inside of front plate 46, biases plunger 48 in a direction towards support rod 22. One end 54 of plunger 48 protrudes through hole 56 in plate 46. By grasping this end 54 and pulling plunger 48 in a direction away from rod 22, gripping device 44 releases its hold on rod 22. This enables yoke 36 to be moved along the longitudinal axis of rod 22. When end 54 is released, spring 50 pushes plunger 48 towards rod 22, and if plunger 48 is aligned opposite one of the grooves 58 in rod 22, for example groove 58a, V-shaped, notched end 60 of plunger 48 bites into groove 58a, thus holding bracket assembly 16 stationary.

The two major components of circuit 18 (FIG. 4) are a linear-variable-differential-transformer, LVDT 62, and temperature-compensating network 64. LVDT 62, which is a conventional electronic device sold by Schaewitz Engineering Corporation of Camden, N.J., is mounted securely to base plate 40 and surrounded by cage 38. A.C. power supply 66 under the control of double pole-single throw on-off switch 68 is connected to the primary coil (now shown) of LVDT 62, and half or full wave rectifier 70 is connected to the secondary coil (not shown) of LVDT 62. Float 72, operably connected to movable core 74 of LVDT 62, floats on the surface of liquid 76, and a fall or rise of the liquid level in tank 12 causes float 72 to move either downwardly or upwardly. This movement controls the position of core 74, and consequently, the character of the output signal from LVDT 62. Temperature-compensating network 64, which is a modified Series 330 thermocouple reference junction sold by the Acromag Corporation of Michigan, generates a temperature-compensating output signal which, along with the rectified output signal from LVDT 62, is fed into amplifier 78. Amplifier 78 mixes these two signals, amplifies the resultant signal, and transmits this amplified signal to voltmeter 80.

More specifically, network 64 includes thermocouple junctions 82 and 84, which are in series connection with Wheatstone bridge 86 and voltage divider 88. Junction 84, which is mounted on channel 20 in a manner enabling it to be brought into contact with liquid 76, senses the temperature of liquid 76, and junction 82, which is not in contact with liquid 76, serves as a reference. These junctions 82 and 84 cooperate to provide an output signal proportional to the temperature difference between them. Changing ambient temperatures will affect junction 82, and bridge 86 will become unbalanced unless electrical means are used to offset such spurious temperature fluctuations. Bridge 86, which includes variable resistor 90, resistor 91, fixed resistors 92, and D.C. power supply 93, provides this means. If the temperature of junction 82 changes during testing, resistor 91, which has the same temperature response characteristics as junction 82, also responds to changes affecting junction 82 temperature and compensates for such changes so that bridge 86 remains balanced. That is, as the potential across junction 82 varies, the potential across resistor 91 also varies by the same magnitude but in an opposite direction.

Voltage divider 88 is initially adjusted so that the output signal from bridge 86 will, during testing, match the output signal from LVDT 62. For example, if a change of 1° F. in the temperature of liquid 76 results in a 5 millivolt output signal from bridge 86, and the same temperature changes results in a 2 millivolt output signal from LVDT 62, slider 94 of voltage divider 88 is set so that the input signal from network 64 to amplifier 78 will be a 2 millivolts.

When apparatus 10 is first inserted into tank 12, variable resistor 90 is adjusted so that bridge 86 generates a zero or null signal. As the temperature of liquid 76 changes, junctions 82 and 84 provide an output signal proportional to the difference between the initial temperature of liquid 76, and the new temperature of liquid 76. This output signal unbalances bridge 86, and bridge 86 then generates either a positive or negative temperature-compensating signal depending on whether the new temperature is either below or above the reference temperature (the temperature at the beginning of the test).

So long as the temperature of liquid 76 remains constant, bridge 86 provides a null signal. However, if the temperature of liquid 76 increases, bridge 86 and voltage divider 88 generates a negative compensating output signal equal in magnitude to the output signal from LVDT 62 but opposite in sign. Thus, the signals from LVDT 62 and network 64 are balanced, and pointer 96 (FIG. 1) of voltmeter 80 does not move. If the temperature of liquid 76 decreases, bridge 86 and voltage divider 88 generate a positive compensating signal which again is equal in magnitude to the output signal from LVDT 62 but opposite in sign. This positive compensating signal is again balanced against the output signal from LVDT 62 in order to keep pointer 96 from moving.

In using apparatus 10, the operator first estimates the approximate liquid level in tank 12, and then makes a coarse adjustment of bracket assembly 16 by grasping end 54 of plunger 48, pulling it away from rod 22, and moving assembly 16 into alignment with the groove corresponding to the liquid level. Then the operator releases end 54, and end 60 bites into the selected groove. Apparatus 10 is now inserted into tank 12, and lip 24a of upper plate 24 rests on the flange of the tank's fill pipe 98. The operator next makes a fine adjustment by screwing end 32 of rod 22 either up or down until float 72 sets core 74 of LVDT 62 such that pointer 96 aligns itself with the zero mark on the meter's scale. Since tank 12 has hole 100, liquid 76 seeps slowly from the tank. This causes float 72 to drop with the drop in liquid level, and core 74 is moved accordingly, causing pointer 96 to shift to the position indicated in FIG. 1 in solid lines (the original liquid level and the original pointer position are indicated in dotted lines). Network 64 adjusts for movement of float 72 due to expansion or contraction of liquid 76 with changes in temperature. Consequently, pointer 96 only moves in response to changes in liquid level due to leakage. This movement of pointer 96 indicates that tank 12 leaks, and the direction pointer 96 moves indicates whether liquid is seeping into or from tank 12.

We claim:

1. Apparatus for detecting whether means containing liquid leaks, comprising:

support means adapted to be inserted into the containing means, said support means being made of a material having virtually a zero coefficient of expansion at normal ambient temperatures;

float means mounted on the support means in an adjustable manner enabling said float means to be brought into floating relationship with the liquid in the containing means; and signal generating means coupled to the float means and actuated by any movement of said float means in response to any change in the level of liquid in said containing means to generate a signal indicating said change.

2. The apparatus defined in claim 1 wherein said signal generating means includes linear-variable-differential-transformer means.

3. The apparatus lefined in claim 1 additionally including means responsive to changes in the temperature of the liquid for providing a temperature signal corresponding to said temperature change.

4. The apparatus defined in claim 3 additionally including means responsive to said temperature signal which generates a compensating signal proportional to said temperature change and imposes said compensating signal on the change in level signal so that said change in level signal only represents changes in liquid level due to leakage of liquid from or into the containing means.

5. In an apparatus for detecting changes in the level of a liquid contained in a tank during a suitable testing period and automatically providing a temperature-compensated signal representing a change in said level due only to leakage of liquid from or into said tank, the combination comprising:
  support means adapted to be inserted into said tank;
  first means on said support means which is responsive to the temperature of the liquid in the tank and which generates a first electrical signal corresponding to said temperature;
  second means movably mounted on said support means so said second means can be brought into floating relationship with the liquid in the tank, said second means being responsive to changes in the level of liquid in the tank to generate a second electrical signal corresponding to said changes in liquid level;
  third means, coupled to said first means and responsive to said first signal, which generates a third electrical signal corresponding to the difference between the temperature of the liquid and a reference temperature equal to the initial temperature of the liquid at the beginning of said testing period; and
  fourth means coupled to said second and third means which mix said second and third signals to provide said temperature-compensated signal.

6. The combination defined in claim 5 wherein said first means is thermocouple means.

7. The combination defined in claim 6 wherein said second means is a float means which floats on the surface of said liquid, and a linear-variable-differential-transformer means operably connected to said float means.

8. The combination defined in claim 7 wherein said third means provides: (a) a null signal so long as the temperature of the liquid remains constant throughout said testing period, (b) a positive compensating signal when the temperature of the liquid goes below said reference temperature, and (c) a negative compensating signal when the temperature of the liquid goes above said reference temperature.

9. The combination comprising:
  an elongated guide channel;
  a pair of support members mounted at opposite ends of said channel;
  a suportp rod made of a material having vitually a zero coefficient of expansion at normal ambient temperatures mounted longitudinally within said channel between said support members;
  an adjustable bracket assembly attached to said support rod and movable along said channel;
  a signal generator, including a linear-variable-differential-transformer mounted on said bracket assembly; and
  a float operably connected to said linear-variable-differential-transformer to regulate the character of the signal provided by said signal generator.

10. The combination defined in claim 9 including a pair of thermocouple junctions to measure temperature.

11. The combination defined in claim 10 including a bridge circuit coupled to one of said junctions for maintaining the potential across said one junction constant.

References Cited

UNITED STATES PATENTS

| | | | |
|---|---|---|---|
| 1,348,015 | 7/1920 | Lee | 340—244 |
| 2,758,474 | 8/1956 | McKinney | 73—313 |
| 2,911,828 | 11/1959 | Keating et al. | 73—290 |
| 2,971,378 | 2/1961 | Mayes | 73—313 |
| 3,012,432 | 12/1961 | Moore et al. | 73—49.2 XR |

LOUIS R. PRINCE, Assistant Examiner

W. A. HENRY II, Assistant Examiner

U.S. Cl. X.R.

340—244